(12) United States Patent
Tsau et al.

(10) Patent No.: US 8,070,470 B2
(45) Date of Patent: Dec. 6, 2011

(54) MOLD ASSEMBLY

(75) Inventors: Tar Tsau, Oakville (CA); Kyi San Kyi, Oakville (CA)

(73) Assignee: Wentworth Mold Ltd., Hamilton (CA)

( * ) Notice: Subject to any disclaimer, the term of this patent is extended or adjusted under 35 U.S.C. 154(b) by 360 days.

(21) Appl. No.: 12/322,819

(22) Filed: Feb. 6, 2009

(65) Prior Publication Data

US 2010/0203186 A1    Aug. 12, 2010

(51) Int. Cl.
B29C 49/48    (2006.01)
(52) U.S. Cl. ........ 425/182; 249/102; 249/111; 249/155; 425/195; 425/522; 425/526
(58) Field of Classification Search .................. 425/182, 425/195, 522, 526; 249/102, 111, 155
See application file for complete search history.

(56) References Cited

U.S. PATENT DOCUMENTS

| | | | |
|---|---|---|---|
| 170,464 A | 11/1875 | Bakewell, Jr. | |
| 705,772 A | * 7/1902 | Messer | ......................... 425/526 |
| 791,240 A | * 5/1905 | Boucher | ......................... 65/236 |
| 3,380,121 A | 4/1968 | Chittenden et al. | |
| 3,768,948 A | 10/1973 | Horberg, Jr. et al. | |
| 3,861,640 A | 1/1975 | Agneta | |
| 3,978,910 A | 9/1976 | Gladwin | |
| 4,032,278 A | 6/1977 | Kuenzig et al. | |
| 4,151,976 A | 5/1979 | Schurman | |
| RE30,215 E | 2/1980 | Kuenzig et al. | |
| 4,330,248 A | 5/1982 | Platte | |
| 4,476,170 A | 10/1984 | Jabarin | |
| 4,699,585 A | 10/1987 | Giese et al. | |
| 4,815,960 A | 3/1989 | Rudolph | |
| 4,822,543 A | 4/1989 | Iizuka et al. | |
| 4,863,046 A | 9/1989 | Collette et al. | |
| 4,884,961 A | 12/1989 | Iizuka et al. | |
| 4,927,680 A | 5/1990 | Collette et al. | |
| 5,217,729 A | 6/1993 | Terauchi et al. | |
| 5,255,889 A | 10/1993 | Collette et al. | |
| 5,411,699 A | 5/1995 | Collette et al. | |
| 5,571,474 A | 11/1996 | Przytulla | |
| 5,766,299 A | 6/1998 | Miller | |
| 5,824,237 A | * 10/1998 | Stumpf et al. | ................... 249/80 |
| 5,968,560 A | 10/1999 | Briere et al. | |
| 6,113,377 A | 9/2000 | Clark | |
| 6,413,075 B1 | 7/2002 | Koch et al. | |
| 6,428,302 B1 | 8/2002 | Tsau | |

(Continued)

FOREIGN PATENT DOCUMENTS

CA        2082350        5/1993

(Continued)

*Primary Examiner* — Robert B Davis (57) ABSTRACT

A mold assembly has two mold half shells each having an outer and inner wall for defining the shape of a container to be formed. Two mold half carriers each have an inner wall overlaying and spaced from a corresponding mold shell outer wall for supporting the shells in the assembly. At least one insulating pad is sandwiched between the inner wall and the corresponding outer wall and is secured to one of the inner wall and the outer wall. The pad supports the outer wall in non-contacting and buffering relation relative the carrier inner wall. Each pad may be secured in a recessed seat in the respective wall. Pads may be secured in recessed seats having a depth less than the thickness of the pad. Pads absorb mold operational forces to reduce wear, reduce conduction from shell to carrier and facilitate the use of different-sized shells with one carrier.

20 Claims, 6 Drawing Sheets

U.S. PATENT DOCUMENTS

| | | |
|---|---|---|
| 6,444,159 B2 | 9/2002 | Petre |
| 6,447,281 B1 | 9/2002 | Petre |
| 6,729,868 B1 * | 5/2004 | Vogel et al. ............... 425/195 |
| 6,913,455 B2 | 7/2005 | Tsau et al. |
| 6,948,924 B2 | 9/2005 | Tsau et al. |
| 6,994,542 B2 | 2/2006 | Tsau et al. |
| 7,025,584 B2 | 4/2006 | Tsau |
| 7,335,007 B2 | 2/2008 | Perez et al. |
| 2005/0006380 A1 * | 1/2005 | Kagan ............... 219/661 |
| 2006/0219709 A1 * | 10/2006 | Kagan ............... 219/661 |
| 2009/0232929 A1 * | 9/2009 | Blochmann et al. ......... 425/522 |
| 2009/0263535 A1 * | 10/2009 | Tonga ............... 425/522 |

FOREIGN PATENT DOCUMENTS

| | | |
|---|---|---|
| CA | 2313881 A1 | 1/2002 |
| GB | 2 240 300 | 7/1991 |
| JP | 63-202425 | 8/1988 |
| JP | 08174552 A * | 7/1996 |

* cited by examiner

MOLD ASSEMBLY

FIELD OF THE INVENTION

The present invention relates to molds for making containers, and more particularly to molds having shell inserts carried by mold carriers where insulative pads are located between the outer walls of the shell and the inner walls of the carriers.

DESCRIPTION OF THE RELATED ART

Mold assemblies having two side mold parts and a base mold part are commonly used in the formation of plastic containers such as, for example, biaxially-oriented PET (polyethylene terephthalate) beverage bottles. The side mold parts may comprise a unitary half-part, multiple half-parts or a unitary shell half insert.

In hot fill applications such as, for example, formation of juice containers that are subsequently filled with hot juices, it is important to maintain elevated temperature levels at the forming surface where the mold face contacts the plastic of the container to form a plastic container capable of withstanding hot filling temperatures of liquids subsequently filled in the container. This is typically accomplished by having heating passages contained in the mold through which hot fluid passes to keep the mold face at the elevated predetermined temperature. The problem with present molds is that heat dissipates away from the mold face to the outer walls of the mold requiring greater heat energy to maintain the elevated predetermined temperature. This heat dissipation also occurs in interchangeable mold shell inserts that are supported in direct contact with standardized mold carriers as the heat is dissipated by conduction directly from the shell insert and out through the mold carrier. Such heat dissipation may cause the outer walls of the mold to heat to a temperature which may be harmful to nearby components or to technicians who may come into contact with the heated mold outer wall.

In hot or cold fill mold assemblies where the mold shells are supported in direct contact with mold carriers, regular operation of the mold assembly may cause mechanical wear where there is contact between inner surfaces of the mold carriers and outer surfaces of the mold shells. This wear may cause unnecessary mold damage and may hasten the need for expensive replacement of the carrier. Moreover, since the mold shells are supported in direct contact by the carriers, the mold carrier is not adaptable to support a mold shell of a different diameter or size without changing the size of the carrier to suit the diameter of the new shell.

U.S. Pat. No. 6,913,455 teaches a hot fill mold assembly which has two mold half shells and two mold half carriers for supporting the mold half shells. Each shell has outer wall surface portions and a plurality of spaced apart slotted grooves extending between the outer wall surface portions that define open air spaces recessed from the outer wall portions. The mold half carriers have a carrier inner wall that overlays in contacting and thermal conducting relation the outer wall surface portions of a corresponding one of the mold half shells. The inner wall of the mold half carriers overlays the spaced apart slotted grooves to create thermal buffering open air pockets between the mold half shells and the mold half carriers so as to reduce the thermal conduction away from the mold face and improve the hot fill container formation. The grooves may be filled with a thermal insulating material. However, in U.S. Pat. No. 6,913,455, there is some contact between the mold half carriers and the mold half shells between the pockets created by the grooves. Some thermal conducting contact exists between the shell outer walls to the carrier inner walls. Therefore, some thermal conduction between the shells and the carriers may take place.

Another concern associated with contact between the mold half carriers and the mold half shells in mold assemblies is wear between the parts. It is thus desirable to provide a mold assembly with improved wear resistance and where there is reduced thermal conducting contact between the carrier inner walls and the shell outer walls. It would also be beneficial to provide a mold assembly able to accommodate mold shells of different diameters and sizes without the need to change the carrier to suit each new shell.

BRIEF DESCRIPTION OF THE INVENTION

In an embodiment of the present invention, there is provided a mold assembly having two mold half shells each having an outer wall and an inner wall. The mold half shells define the shape of at least a portion of the container to be formed. The mold assembly further includes two mold half carriers each having a carrier inner wall overlaying and spaced from a corresponding shell outer wall for supporting the mold half shells in the assembly. At least one insulating pad is sandwiched between each carrier inner wall and the corresponding shell outer wall. The at least one pad is secured to one of the carrier inner wall and the corresponding shell outer wall. The pad supports the corresponding shell outer wall in non-contacting and buffering relation with the inner walls of the mold half carrier.

The placement of the insulating pads spaces the carrier inner wall and the shell outer wall. The non-contacting relationship between the shell outer walls and the carrier inner walls prevents unnecessary wear on the mold carrier and reduces damage to the mold assembly. The pads also provide a buffer between the shell outer walls and the carrier inner walls. With the pads in place, the mold shell is supported without direct contact between outer wall of the mold shell and the inner wall of the carrier. Accordingly, the pads absorb the mechanical forces associated with the operation of the mold assembly. Moreover, thermal conducting contact between the shell outer walls and the carrier inner walls is prevented. In this manner, heat exchange between the shell and the carrier is buffered and therefore substantially reduced.

Each of the two mold half shells may be unitary mold shells or modular mold shells including at least an upper body mold section and a lower body mold section. The insulating pad may be of a material that is dimensionally stable.

In an alternative embodiment of the present invention, a plurality of insulating pads is secured to the one of the carrier inner wall and the corresponding shell outer wall. The insulating pads are sized and spaced to provide a uniform mechanical and thermal load distribution between the inner walls of the mold half carrier and the corresponding shell outer wall. The insulating pads help to contain the heat/cooling supplied to the mold assembly. The pads may be spaced for defining thermal air buffering zones between the pads. The air buffering zones reduce heat transfer from the shell to the carrier.

In another embodiment, the one of the carrier inner wall and the corresponding shell outer wall has a recessed seat comprising a depth. The insulating pad is secured within the recessed seat and has a thickness which exceeds the depth of the recess.

The mold assembly may be adaptable for use with mold shells of different diameters or sizes without the need to change the carrier to accommodate different-sized shells, within predetermined operational parameters. In order to accommodate mold shells of a lesser diameter, thicker pads may be used in the mold assembly. In order to accommodate mold shells of a greater diameter, thinner pads may be used in the assembly. By changing the thickness of the pads used in the assembly, a mold carrier of constant diameter may accommodate mold shells having different diameters less than the diameter of the inner wall of the mold carriers.

Typically, the mold carrier and shell comprise similar materials to maintain acceptable tolerances between these parts during thermal expansion and contraction of the carrier and shell during mold operation. However, the use of pads of varying thickness permits for the use of dissimilar materials having different coefficients of thermal expansion. For example, stainless steel has a coefficient of thermal expansion less than the coefficient of thermal expansion of aluminum. Hence, the pads permit for a stainless steel shell to be used with an aluminum carrier because the stainless steel shell is directly heated to a temperature during operation which is greater than the temperature that the aluminum carrier reaches as a corollary of the close proximity of the carrier to the shell. Consequently, the thermal expansion of both the stainless steel shell and aluminum carrier in this application are within acceptable tolerances. This also allows for the use of a lighter aluminum carrier to that of a stainless steel carrier while having the advantage of a more durable stainless steel shell. It should be understood, however, that an aluminum shell may not be used with a stainless steel carrier in the same manner. Since the coefficient of thermal expansion of aluminum is greater than the coefficient of thermal expansion of stainless steel, the direct heating of the shell relative the carrier during mold operation would result in substantially greater thermal expansion in the aluminum shell than it would in the stainless steel carrier. Thereby, acceptable tolerances between the aluminum shell and the stainless steel carrier would not be maintainable.

In another embodiment, there is provided a mold assembly having shape-defining means for defining the shape of at least a portion of a container to be formed, carrier means overlaying and spaced from the shape-defining means for supporting the shape-defining means in the assembly and insulating means sandwiched between the carrier means and the shape-defining means. The insulating means is secured to one of the carrier means and the shape-defining means for supporting the shape-defining means in non-contacting and buffering relation with the carrier means.

BRIEF DESCRIPTION OF THE DRAWINGS

For a more thorough understanding of the present invention reference may be had, by way of example, to the accompanying diagrammatic drawings in which.

DETAILED DESCRIPTION OF THE INVENTION

Referring to the drawings, the embodiments of the present invention are described. While the mold assembly described herein is adapted for making a hot fill PET bottle, it should be understood that the mold apparatus shown can be used for cold fill operations as well as for the manufacture of other types of containers where the mold face is changed, such as for example, soft drinks, cleansers and detergent-type containers, to name a few. In the exemplary embodiment, the mold half shell is made from stainless steel and the mold half carrier is made from aluminum. However, it should be understood that the mold half shells and the mold half carriers may be made from similar materials suitable for use in a mold assembly, such as for example, a stainless steel shell and carrier, or an aluminum shell and carrier.

Figure 1:
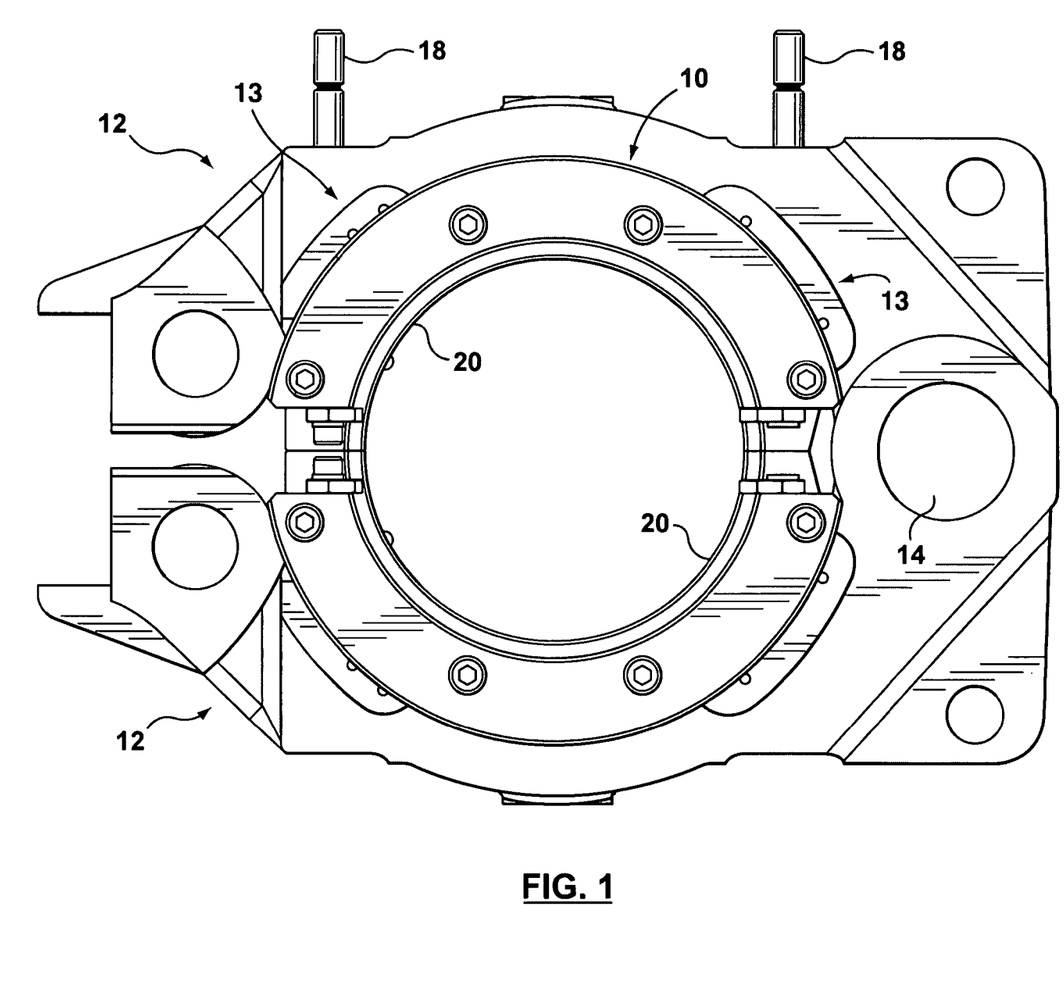
FIG. 1 is a plan view of the mold carrier of the present invention.
Figure 2:
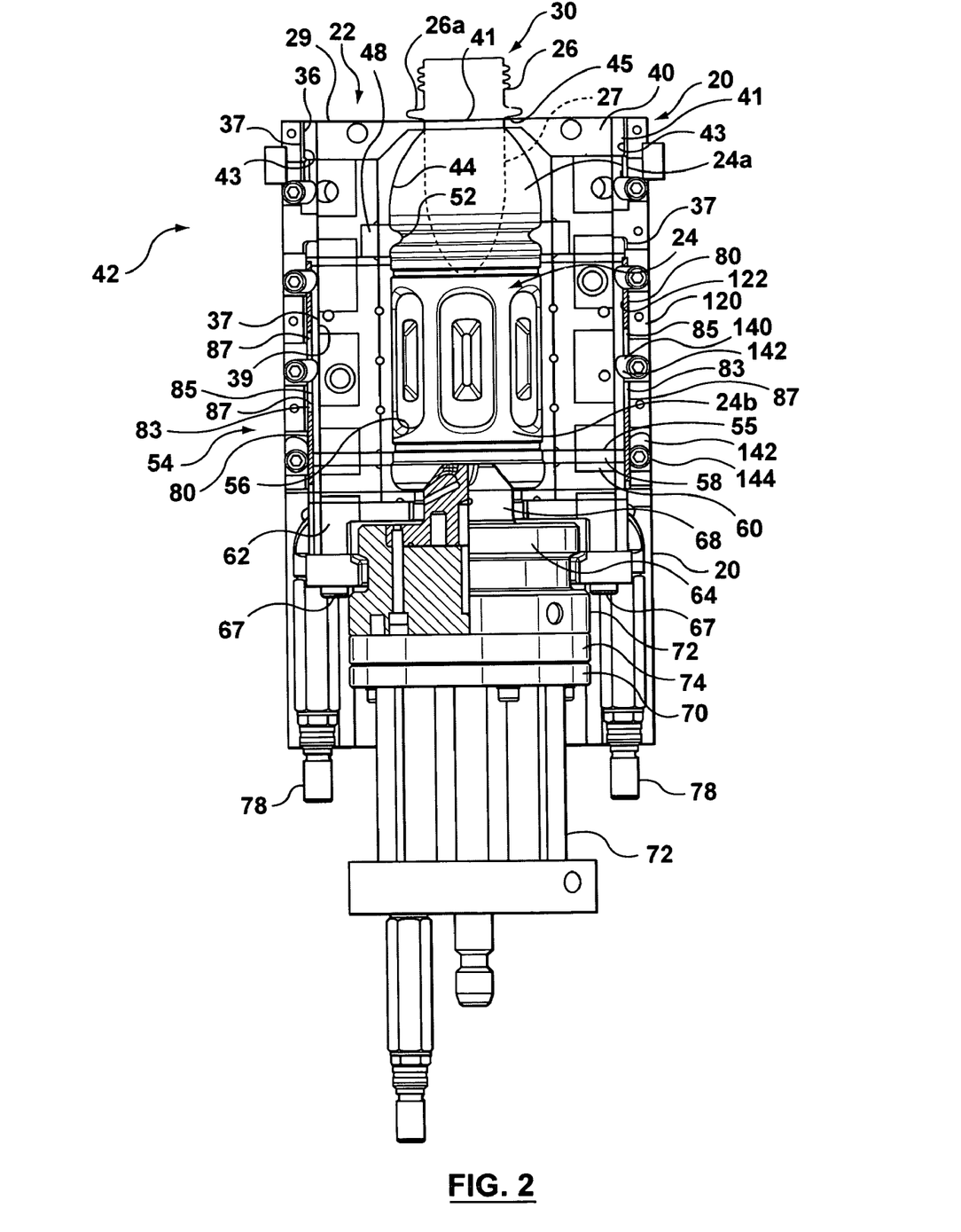
FIG. 2 is a side sectional view of the mold assembly.

Referring to FIGS. 1 and 2, the mold assembly 10 is supported by a pair of support arms 12 which pivot about a pivot pin or axis 14. A lever arm (not shown in figures) causes the support arms 12 to pivot about axis 14 to move the support arms 12 into the closed position shown. The support arms 12 support each of the two mold half carriers 20. A first one of the mold half carriers 20 is fixedly secured to one of the support arms 12 by a threaded screw (not shown) or any other suitable connecting device. A second one of the mold half carriers 20 cooperates with a seat 13 on the other one of the supporting arms 12. Spring-loaded bolts 18 pass through the support arm 12 and couple with the second carrier 20. The bolts 18 bias the second carrier 20 into the seated engagement with the other supporting arm 12 by applying a pulling force to the second carrier 20 in the direction of the support arm 12. The mold half carriers 20 each carry a modular mold half shell 22. Modular mold half shells 22 define a cavity 24 whose shape determines the shape of the container formed in the cavity 24. During container formation, the support arms 12 hold the mold half carriers 20 and shells 22 in the closed position shown. While the detailed description relates to the use of modular mold half shells 22, it should be understood that the present invention is applicable also for use with unitary mold half shells.

Shown in FIG. 2, a plastic preform 30 has a neck 26 and an elongated tubular portion 27. The neck 26 is mounted to a molding machine (not shown) against the top surface 29 of the mold shells 22 with the tube portion 27 of the preform 30 extending into the cavity 24 of the mold shells 22. Pressurized air is blown by a nozzle into neck 26 of preform 30 to expand tube 27 into the cavity 24. Later in the formation, the support arms 12 are pivoted about axis 14 to separate the carriers 20 and shells 22 to permit removal of the formed container and to permit interchanging of shells 22 from carriers 20.

Figure 4:
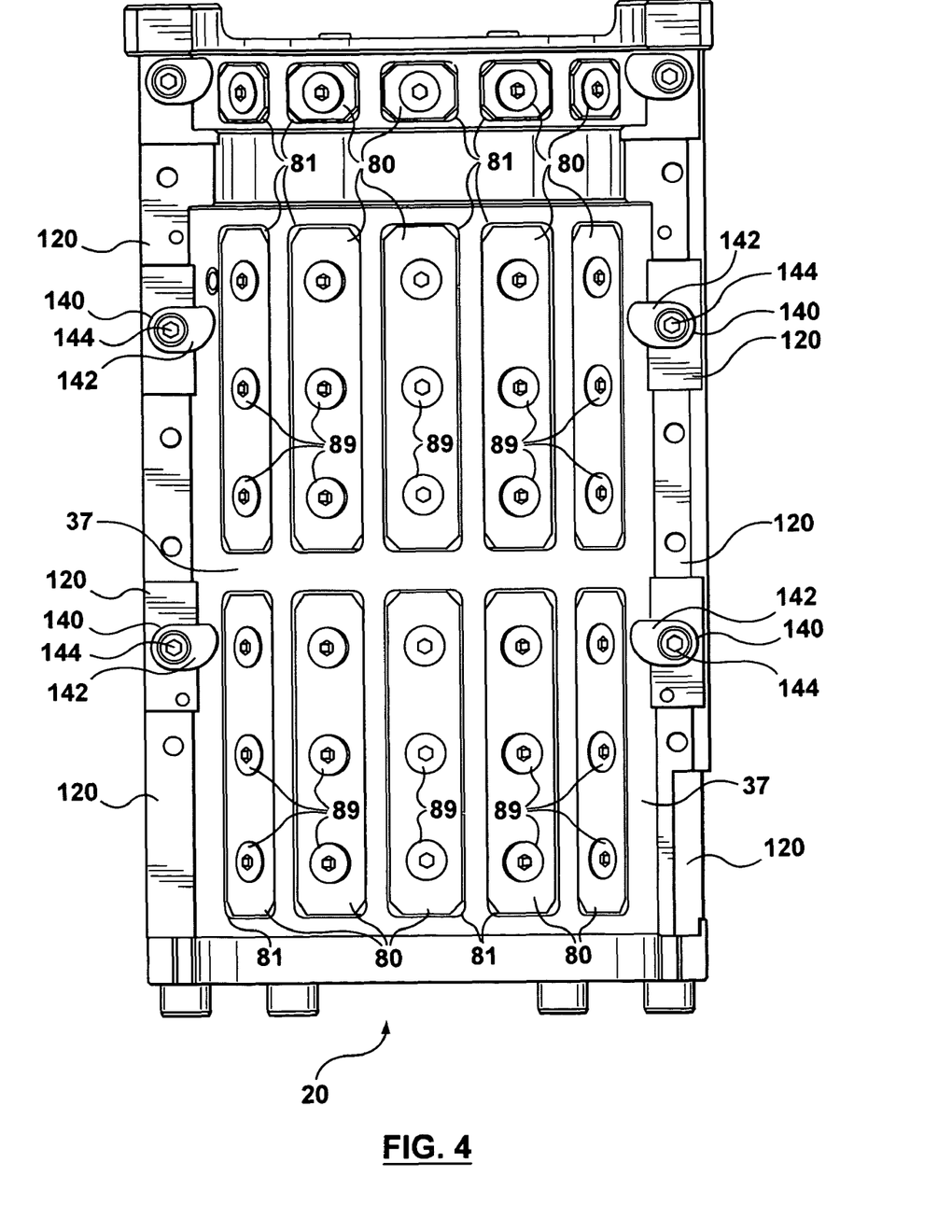
FIG. 4 shows a pattern of insulating pads located on the inner walls of the mold half carriers.
Figure 5:
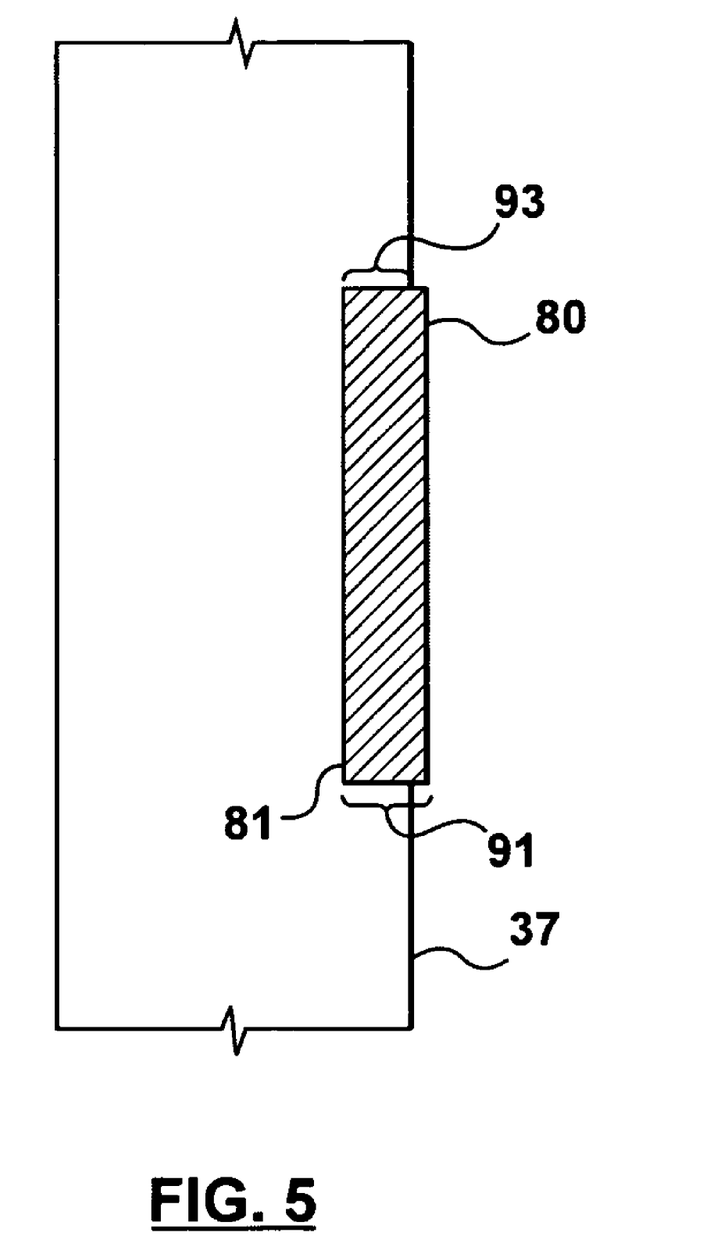
FIG. 5 illustrates a cross-section of the mold half carrier and pad showing an insulating pad within a recess.

The two modular mold half shells 22 each have an upper body mold section 42 and a lower body mold section 54 releasably secured to the upper body mold section 42. The upper body mold section 42 has upper inner walls 44 defining an upper cavity 24a whose dome shape corresponds to at least an upper portion of the container to be formed. The upper body mold section 42 has a first outer wall 36 that is in supported cooperation via insulating pads 80 with inner wall 37 of one of the carriers 20. The lower body mold section 54 has body inner walls 37 defining a lower cavity 24b that corresponds to at least a portion of the body of the container to be formed. The lower body mold section 54 has a second outer wall 39 also in supported cooperation via insulating pads 80 with the inner wall 37 of one of the carriers 20. As best seen in FIGS. 4 and 5, the insulating pads 80 extend from the carrier inner wall 37 for contacting the respective mold section outer walls 36, 39.

In addition to the modular parts of each mold half shell 22 described above, each mold half shell 22 comprises top cavity inserts 40 which define an aperture or opening 41 through which the preform 30 may be inserted. The top cavity insert 40 forms a composite part of the upper body mold section 42.

The top cavity inserts 40 have third outer walls 43 which are also surrounded by the inner walls 37 of the carriers. The top cavity inserts 40 have a seating surface or face 45. In this embodiment, the seating face 45 is recessed in the top cavity inserts 40 and surrounds the aperture 41. The seating surface 45 may alternatively be elevated or comprise several faces positioned on the same plane. The seating face 45 is adapted to receive the neck 26 of the preform 30 and positively locate the neck 26 against the seating face 45.

The upper body mold section 42 is further adapted to receive cavity insert 48 which has a convex shaped groove 52 that is formed in the container.

The parting faces between the mold carriers 20 and the carrier shells 22 are shown in FIG. 2 for the mold carriers 20 at parting face 120 and for the mold half shells or modular half shells 22 at parting face 122. The shells 22 are releasably secured within the carriers 20 by latches 140. The latches 140 comprise tabs 142 that are rotated about locating bolts 144 mounted to the parting face 120 of the carriers 20. The tabs 142 are rotated from a vertical position to a horizontal position across the parting face 122 of the shells 22 so as to secure the shells 122 within the cavity formed in the mold carriers 20 when bolts 144 are tightened.

Referring to FIG. 2, the modular mold shells 22 are shown to co-operate with a push up base 68 to define the base of the container to be formed. The base 68 rests upon base holder 70 which is mounted to pedestal 72 via a pedestal spacer 74.

Located below the upper body mold section 42 and forming part of the mold half shell 22 is the main lower body mold section 54. The lower body mold section 54 has a lower surface 55 against which buts a shim mold section 58. For a more detailed description of the shim mold section 58, reference is made to U.S. Pat. No. 6,913,455, which is herein incorporated by reference.

Positioned below the shim mold section 58 is a bottom cavity insert 60. The bottom cavity insert 60 cooperates with the push up base 68 to define the bottom shape or contour of the container to be formed. Located immediately below the ring 60 is a lower cavity insert 62 which is also mounted in butting relation on top of a wear ring 64.

In the illustrated embodiment, the mold assembly 10 is utilized as a hot fill mold and comprises passageways or channels 78 provided at both the bottom and top of the shells 22 for supplying liquid, such as for example, oil, into the shells 22 to regulate the temperature of the mold half shells 22. The passageways 78 at the bottom shells 22 pass into the body ring 62 and up through the mold half shells 22 and out through the upper passageways 78 mounted into the top cavity insert 40. In operation, heated fluid under pressure passes through one of the passageways 78 and through the mold half shells 22 and out the other end of the mold half shells 22 so as to heat inner walls 44, 37 of the upper body mold sections 42 and the lower body mold sections 54.

Referring to FIGS. 2 through 5, the insulating pads 80 are sized and spaced to provide uniform load distribution for supporting the mold half shells 22. The pads 80 may also be sized and spaced for providing uniform thermal buffering between the shells 22 and each carrier inner wall 37. The pads 80 are sandwiched between the inner walls 37 of each of the mold half carriers 20 and the outer walls 36, 39 of the mold half shells 22. The pads 80 support the outer walls 36, 39 in a non-contacting and buffering relationship with the inner wall 37. In the buffering relationship, the pads 80 buffer the inner walls 37 from the outer walls 36,39 to protect the inner walls 37 from thermal exposure, mechanical wear, or both, which may occur during operation of the mold assembly 10. Therefore, the pads 80 may absorb temperature differences or mechanical shock which may occur between the inner walls 37 and the outer walls 36,39 during operation of the assembly 10. In one embodiment, the pads 80 are secured with the inner walls 37 of the mold half carriers 20 and extend toward and abut the outer walls 36, 39 of the mold shells 22. The pads 80 provide a thermal insulative barrier between the mold half shells 22 and the mold half carriers 20 to reduce thermal conduction therebetween. In one exemplary embodiment, the inner walls 37 of the mold half carriers 20 have recessed seats 81 corresponding to each pad 80 and within which the pads 80 may be secured. Each seat 81 has a depth 93 and each pad 80 has a thickness 91. The thickness 91 exceeds the depth 93 of the recess 81. In an exemplary embodiment, each recessed seat 81 may be approximately 4 mm deep. The insulating pads 80 extend 1 mm out of the seats 81 to abut the mold shell outer walls 36, 39 to space the mold shells 22 from the mold carriers 20 by a distance of 1 mm. It should be understood that the pads 80 may extend more or less than 1 mm out of the recessed seats 81 provided that the inner walls 37 are spaced from the outer walls 36, 39. Further, it should be understood that the inner walls 37 and outer walls 36, 39 may be spaced without the use of recessed seats 81, wherein the pads 80 may be secured to surface portions of the inner walls 37. The pads 80, as shown in FIG. 2, provide open air spaces 85 which extend between, or around the outer periphery of, the pads 80, and between the mold half shells 22 and the mold half carriers 20. Each open air space 85 provides a thermal air buffering zone 87 that reduces thermal conduction from the mold face through the shells 22 and out through the mold carriers 20.

Figure 3:
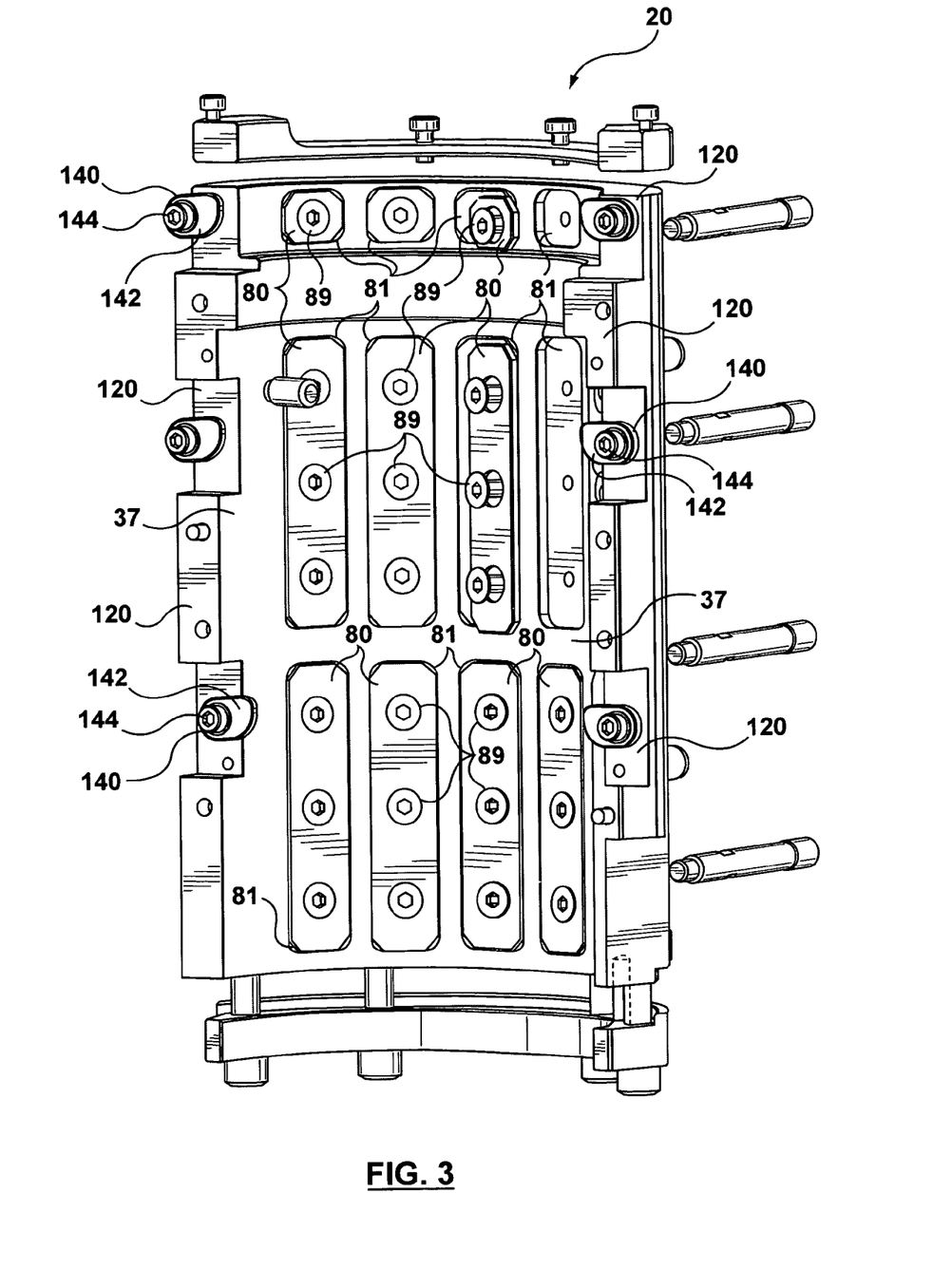
FIG. 3 shows the insulating pads of the present invention and their engagement with the recesses in the inner walls of the mold half carriers.
Figure 6:
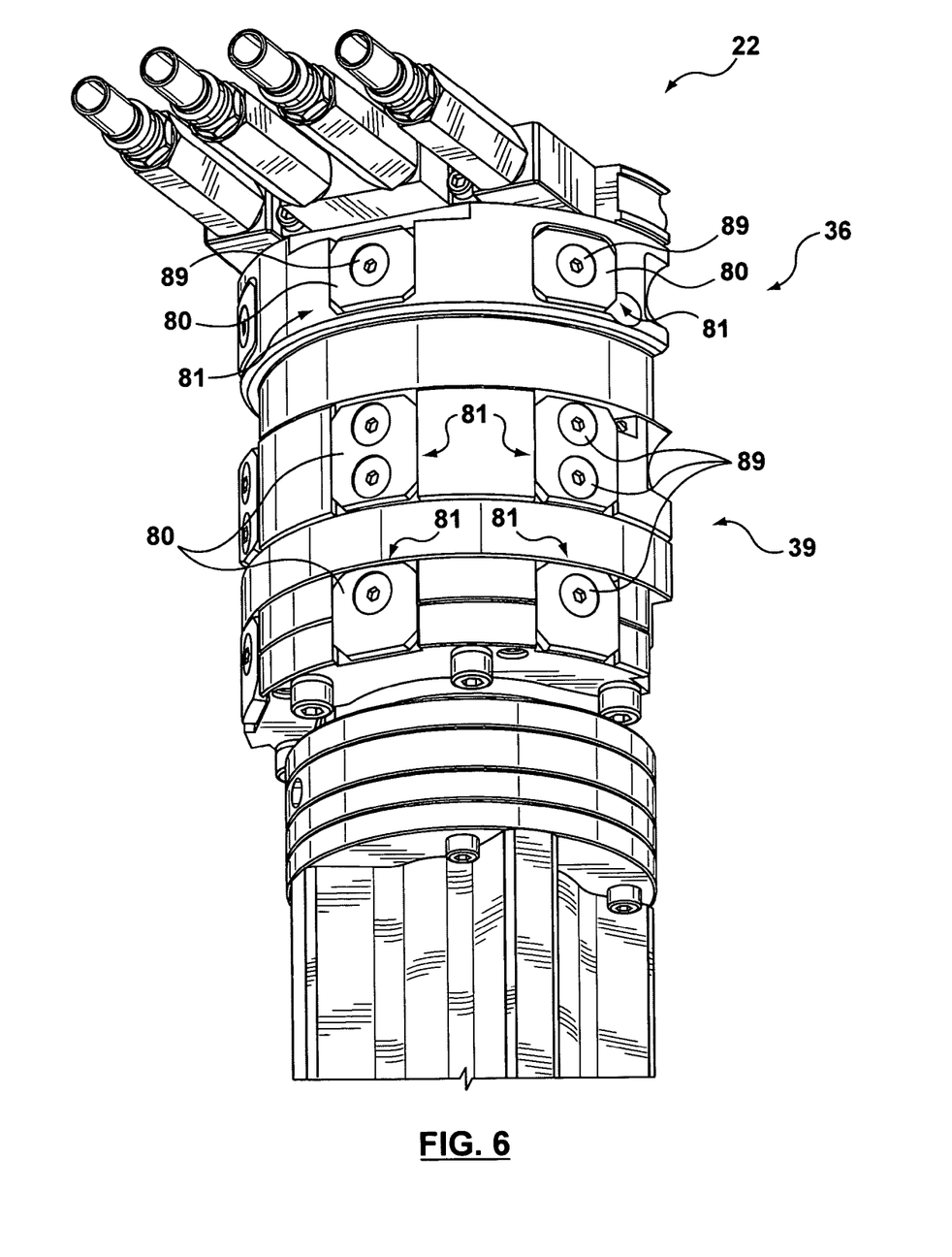
FIG. 6 illustrates an embodiment of the invention with the pads secured with the outer walls of the mold shell.

In an exemplary embodiment, the pads 80 are formed of a material that is dimensionally stable. That is, the material of the pads 80 does not expand more than the material of which the mold carriers 20 are made. This prevents interference between the pads 80 and the recesses 81 when the carrier 20 is heated during operation. Preferably, the material of the pads 80 does not expand when heated beyond the required tolerances of the system. Suitable materials include, but are not limited to, Phenolic-CE. The pads 80 may be fastened to the carrier walls 20 by any suitable means including the application of an adhesive, the use of clips, or fastening by screws passing through the pad 80 and into the respective inner wall 37 of the carrier 20. In FIGS. 3, 4 and 6, the pads 80 are shown to be fastened into the recessed seats 81 by counter-sink screws 89 which pass through the pads 80 and into the respective seat 81 into which the pad 80 is to be secured.

While the invention has been shown and described with respect to the insulating pads 80 being carried by the inner walls of mold half carriers, alternatively, the pads 80 could be carried by the outer walls 36, 39 of the mold half shells 22, as shown in FIG. 6. While the insulating pads 80 have been shown to have a generally rectangular shape, it should be understood that the shape of the insulating pads 80 may be any suitable shape that provides the features of the present invention. Where a plurality of pads 80 are used, it is preferable that the pads 80 are distributed such that there is an even load on each pad 80.

Though the pads 80 have been described as having a thickness 91, it should be understood that pads 80 of a predetermined thickness 91 may be exchanged for pads 80 of a different thickness 91 in order to accommodate mold shells 22 of any diameter. Where it is desirable to use a mold shell 22 of a lesser diameter, pads 80 having a greater thickness 91 may be used. Where it is desirable to use a mold shell 22 of a greater diameter, pads 80 having a lesser thickness 91 may be used. In this way, the mold shell 22 may be changed while avoiding the need to change carrier 20 to suit the diameter of the new mold shell 22.

While the invention has been described in terms of various specific embodiments, those skilled in the art will recognize that the invention can be practiced with modifications within the scope of the present invention as disclosed herein.

What is claimed is:

1. A mold assembly comprising:
   two mold half shells each having a shell outer wall and a shell inner wall for defining the shape of at least a portion of a container to be formed;
   two mold half carriers each having a carrier inner wall overlaying and spaced from a corresponding shell outer wall for supporting the mold half shells in the assembly; and
   at least one insulating pad sandwiched between each carrier inner wall and the corresponding shell outer wall, the at least one pad secured to the carrier inner wall and supporting the corresponding shell outer wall in non-contacting and buffering relation with the carrier inner wall.

2. A mold assembly as in claim 1, wherein:
   a plurality of insulating pads are secured to the carrier inner wall; and
   the insulating pads are sized and spaced to provide a uniform mechanical and thermal load distribution between the inner walls of the mold half carrier and the corresponding outer wall of the mold half shell.

3. A mold assembly as in claim 2, wherein:
   the pads are spaced for defining thermal air buffering zones between the pads.

4. A mold assembly as in claim 1, wherein:
   the carrier inner wall has a recessed seat comprising a depth; and
   the insulating pad is secured within the recessed seat and has a thickness which exceeds the depth of the recess.

5. A mold assembly as in claim 1, wherein:
   the insulating pad comprises a material which is dimensionally stable.

6. A mold assembly as in claim 1, wherein:
   the two mold half shells comprise modular mold shells, each having at least an upper body mold section and a lower body mold section.

7. A mold assembly as in claim 2, wherein:
   the mold half shells in a closed position define a cavity for determining the shape of at least a portion of a container molded therein.

8. A mold assembly as in claim 2, wherein:
   the carrier inner wall has a plurality of recessed seats comprising a common depth; and,
   the plurality of insulating pads are secured within a corresponding one of the recessed seats and each of the pads has a common thickness which exceeds the common depth of the recesses.

9. The mold assembly of claim 4 wherein the insulating pad is secured to the recess by one of an adhesive, clips, and a screw.

10. The mold assembly of claim 8 wherein the plurality of insulating pads are secured within the corresponding recessed seats by one of an adhesive, clips, and a screw.

11. The mold assembly of claim 1, wherein the mold half carriers are comprised of aluminum and the mold half shells are comprised of stainless steel.

12. A mold assembly comprising:
    two mold half shells each having a shell outer wall and a shell inner wall for defining the shape of at least a portion of the container to be formed;
    two mold half carriers each having a carrier inner wall overlaying and spaced from a corresponding shell outer wall for supporting the mold half shells in the assembly;
    a plurality of insulating pads sandwiched between the carrier inner walls of the mold half carriers and the outer walls of the mold half shells, the pads being secured with the inner walls of the mold half carriers; and,
    a plurality of recessed seats within the inner walls of the mold half carriers, the seats having a common depth, the seats having secured therein a corresponding one of the plurality of insulating pads, each having a common thickness greater than the common depth, the pads extending a common predetermined distance out of the seats to abut the shell outer walls to support the shell outer walls in non-contacting and buffering relation with carrier inner walls.

13. A mold assembly as in claim 12, wherein:
    the insulating pads are sized and spaced to provide a uniform mechanical and thermal load distribution between the inner walls of the mold half carrier and the outer walls of the mold half shells.

14. A mold assembly as in claim 13, wherein:
    the insulating pads are spaced for defining thermal air buffering zones between the pads.

15. A mold assembly as in claim 12, wherein:
    the insulating pads comprise a material which is dimensionally stable.

16. A mold assembly as in claim 12, wherein:
    the two mold half shells comprise modular mold shells, each having at least an upper body mold section and a lower body mold section.

17. A mold assembly as in claim 12, wherein:
    the mold half shells in a closed position define a cavity for determining the shape of at least a portion of a container molded therein.

18. A mold assembly as in claim 12, wherein:
    the plurality of insulating pads is secured to the corresponding recessed seat by one of an adhesive, clips, and a screw.

19. A mold assembly as in claim 12, wherein the mold half carriers are comprised of aluminum and the mold half shells are comprised of stainless steel.

20. A mold assembly comprising:
    shape-defining means for defining the shape of at least a portion of a container to be formed;
    carrier means overlaying and spaced from the shape-defining means for supporting the shape-defining means in the assembly;
    insulating means sandwiched between the carrier means and the shape-defining means, the insulating means secured to the carrier means for supporting the shape-defining means in non-contacting and buffering relation with the carrier means.

* * * * *